June 1, 1937.  W. J. KAUFFMAN  2,082,008
CALCULATING AND INDICATING MECHANISM
Original Filed Feb. 26, 1931   4 Sheets-Sheet 1
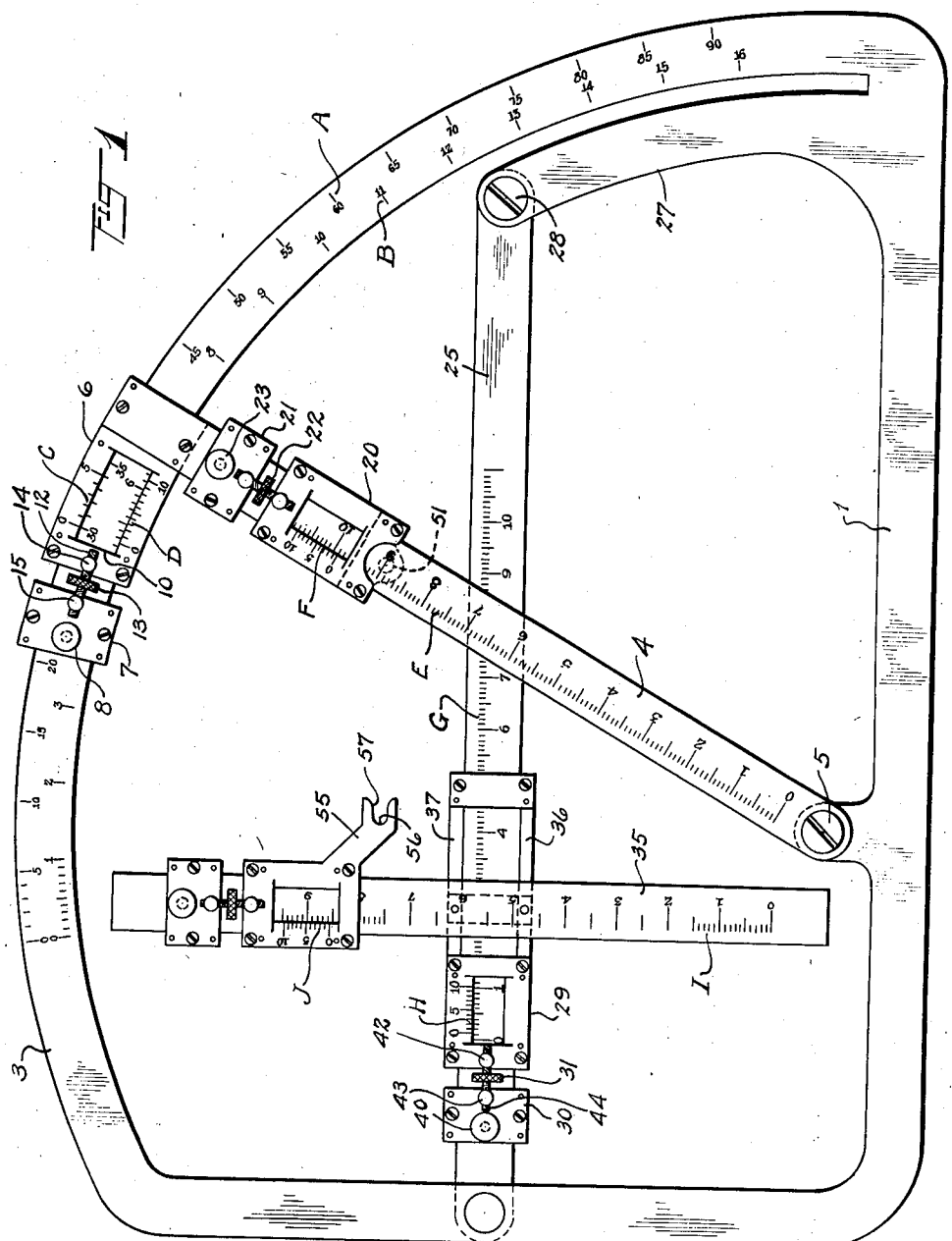
INVENTOR
W. J. Kauffman
BY John D. Morgan
ATTORNEY June 1, 1937. W. J. KAUFFMAN 2,082,008
CALCULATING AND INDICATING MECHANISM
Original Filed Feb. 26, 1931 4 Sheets-Sheet 2
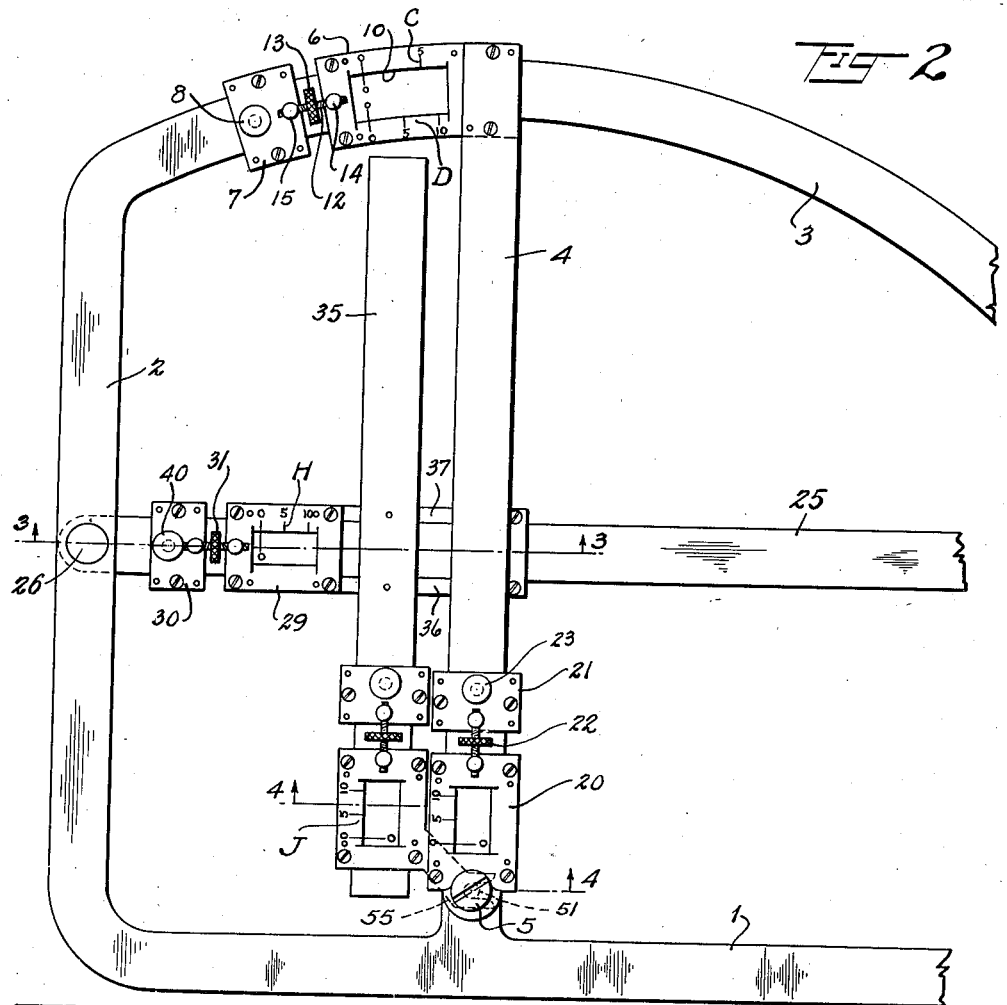
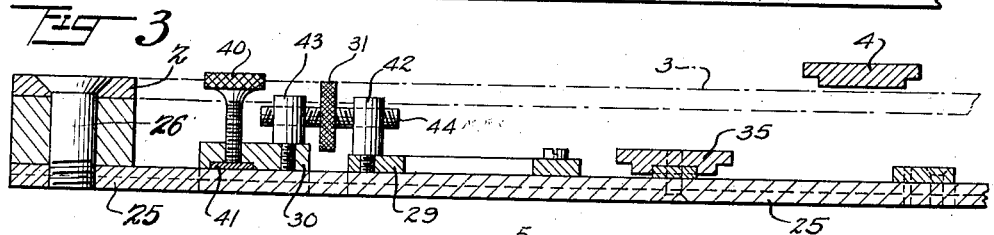
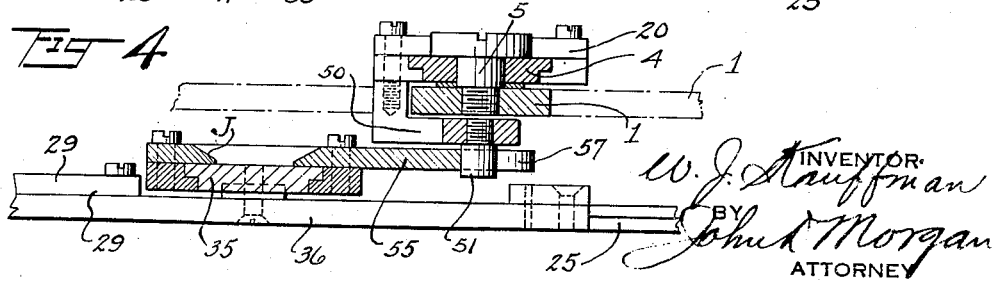
INVENTOR.
W. J. Kauffman
BY
John L. Morgan
ATTORNEY

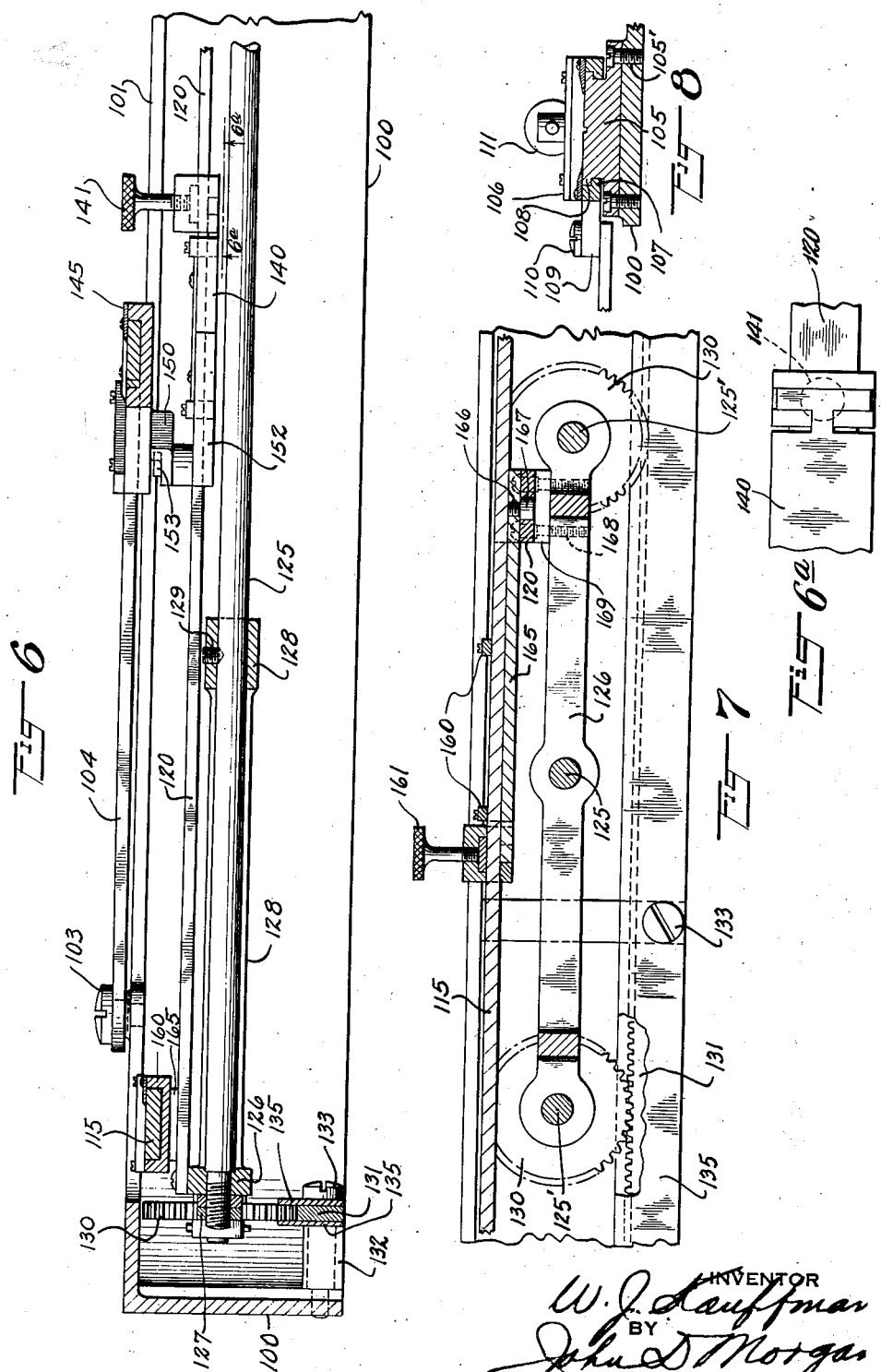

Patented June 1, 1937

2,082,008

UNITED STATES PATENT OFFICE 2,082,008

CALCULATING AND INDICATING MECHANISM

William J. Kauffman, Summit, N. J.

Application February 26, 1931, Serial No. 518,403
Renewed October 17, 1936

3 Claims. (Cl. 33—97)

The invention relates to a novel and useful mechanism for calculating and indicating geometrical and trigonometrical quantities and more particularly for laying out and solving triangulation data used in surveying.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a plan view of one preferred embodiment of the invention;

Fig. 2 is a fragmentary plan view of the mechanism shown in Fig. 1, with the parts in their "zero" positions;

Fig. 3 is a transverse section on line 3—3 of Fig. 2;

Fig. 4 is a section on line 4—4 of Fig. 2;

Fig. 6 is a section on line 6—6 of Fig. 5;

Fig. 6a is a fragmentary bottom plan view taken on line 6a—6a of Fig. 6;

Fig. 7 is a section on line 7—7 of Fig. 5; and

Fig. 8 is a section on line 8—8 of Fig. 5.

Figure 5:
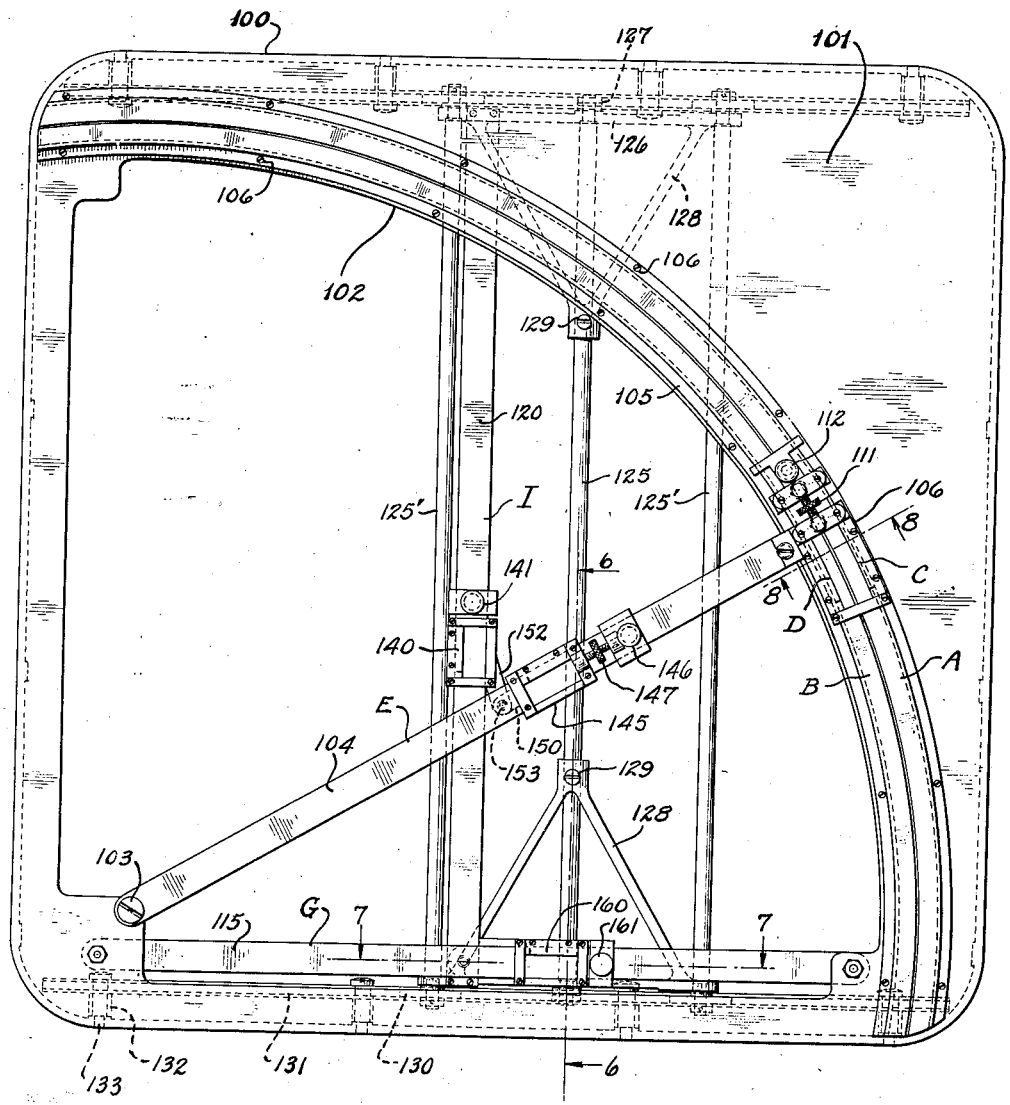
Fig. 5 is a plan view of another preferred embodiment.

The invention is directed to providing a simple, accurate and useful device for assisting in the computation of traverses in surveying work. The device of the invention is especially adapted to mechanically solve and indicate the solutions of substantially all the problems encountered in terrestrial surveying when the usual data are given. The most common surveying computation is that of making a traverse by computing and tabulating the latitudes and departures of successive courses. This computation comprises the solution of a succession of right-angled triangles, the hypothenuse and angles being given. Accordingly the mechanism of my invention is primarily adapted to solve and indicate the elements of right triangles and comprises devices for laying out and indicating the given elements of a triangle to be solved, said devices being adapted to position cooperating means for automatically completing the solution of the triangle.

Previous methods of accurately ascertaining and computing the latitudes and departures of courses are exceedingly laborious, complicated and conducive to errors. For example, the use of traverse tables is unsatisfactory and arduous because such tables read only to degrees and single minutes and therefore require numerous interpolations. Errors also develop due to misplacing of decimal points, the use of wrong indices, etc. unless extreme care is used. Furthermore, with extensive dimensions, several numbers must be taken from the tables and added to give each latitude and departure. The logarithmic method is accurate, but involves a tremendous amount of intermediate calculations and interpolations to arrive at results, especially in large work. Even with the more modern use of natural functions and a calculating machine, two functions must be sought and two multiplications executed for each course.

My invention is superior to any previous method because the results sought can be obtained by direct readings and to the required accuracy.

My invention further comprises instrumentalities for solving quantities and functions, other than those relating directly to triangles, which are useful and important in surveying work. I refer to the solution of the circle and functions thereof, such as the calculation of curves, arcs, chords, radii, tangents, secants, etc. Present methods of arriving at satisfactory results for these problems are, in many cases, even more arduous and complicated than those involved in the solution of triangles. By my invention, the above enumerated circular functions can be obtained readily and with adequate accuracy.

Broadly described, the present preferred embodiment of my invention comprises a base or frame having a circular arc or protractor measuring to a quadrant of a circle, together with movable, graduated arms or scales arranged to measure and indicate the hypothenuse and legs of right-angled triangles under varying conditions, whereby substantially any such triangle may be laid out and the unknown elements thereof automatically indicated on the protractor and scales. Movable verniers are preferably mounted on the scales or measuring devices, said verniers being carefully graduated in units and fractions or decimals of the units of the scales, so that extreme accuracy can be accomplished and the results of the computations read directly on the scales and protractor.

The arc or protractor is preferably graduated with both lineal and angular units or degrees, and thus both lineal distances along the arc and angular quantities may be read thereon. This dual graduation of the protractor simplifies and expedites the solution of many curve problems and adds greatly to the scope and applicability of the device.

The mechanism of my invention involves certain automatic and time-saving principles, whereby the laying out of the given elements of a triangle or other figure on the scales effects an automatic positioning of the other scales or verniers so that the unknown elements of the figure are automatically calculated and the solution of the triangle or other figure indicated by said automatic positioning. The device is furthermore designed to permit movement and positioning of the parts with minimum friction, binding and interference, thereby making for rapidity of operation and the great accuracy required in a precision instrument. At the same time, the construction of the device is substantially rugged and simple so that it will not be easily misaligned by wear or distortion.

As hereinbefore indicated, the mechanism of my invention is adapted for solving an exceedingly great number of common problems in surveying. Some of the important computations solved thereby are set forth in the following list:

(a) The complete traverse of a survey except the final tabulation.

(b) Any right angled triangle in one operation.

(c) Any other type of triangle by resolving it into two right angled triangles. This requires two operations.

(d) Co-ordinates to points in curves (e) Radius when tangent and I. P. angle are given.

(f) Tangent when radius and subtending angle or arc are given.

(g) P. I. angle when radius and tangent are known.

(h) Secant distances on any angle.

(i) Altitude of triangle when sides and one base angle given.

(j) Altitude of parallelogram when sides and angles are known.

(k) Length of curves when co-ordinates or other sufficient data are given.

(l) Subtending angle when radius and length of curve are given.

(m) Length of curve when radius and subtending angle are known.

The foregoing list is by no means conclusive or complete, and it will be evident to the skilled computor, upon use and practice with the mechanism, that many other operations and applications of the device are possible.

The foregoing general description, and the following detailed description, as well, will be understood to be exemplary and illustrative of the invention but not restrictive thereof.

Referring now in detail to the present preferred embodiments of the invention, two forms thereof are shown in the accompanying drawings. The form shown in Figs. 1 to 4 illustrates a relatively simple device adapted for carrying out the main principles of the invention under conditions where speed and conformability to surrounding conditions are prerequisite. This form of the device in reduced size is especially well adapted for field work, as it can be carried about and used by the surveyor in the field and will there give results of an accuracy commensurate with his other instruments and implements.

The mechanism illustrated in Figs. 5 to 8 is preferably a larger scale instrument, designed to provide more concert of movement and attain a greater degree of accuracy and precision. This latter device is primarily adapted for office calculations, where precision instruments may be properly handled and cared for.

Referring now to the embodied form of the invention illustrated in Figs. 1 to 4, a relatively light and rigid base or frame is provided, comprising the horizontal reach or leg 1, vertically disposed leg 2, and an arcuate member 3 preferably integral with and joining the ends of the legs 1 and 2, thereby forming a roughly segmental or quadrant shaped frame for supporting and cooperating with the movable parts of the device.

As shown in Fig. 1, a full quadrant or 90° of arc on the member 3 is graduate to form a protractor scale. It will be noted that the graduations A, preferably along the outer or peripheral edge of the protractor, are the usual angular divisions, the graduations preferably being to single degrees of arc and subdivisions thereof. In addition, the curved scale is also graduated to show linear units B and subdivisions around the curve, and these are indicated preferably on the inner edge of the arc. It will be understood that the outer an inner edges of the arcuate member 3 are concentric with respect to the geometrical center of said member.

Means are provided for laying off and indicating pre-determined angular quantities and/or arcuate distances on the protractor scales, and for this purpose, an angularly movable arm 4 is provided for pivotal movement about the geometrical center 5 of the arcuate member 3. As shown in Fig. 4 the radial arm 4 is provided with a suitable pivotal mounting at the center 5, and this mounting will be hereinafter described in detail.

The embodied means for laying off and setting angles or arcuate quantities on the protractor scales comprises a curved guide 6 which is attached to the outer end of arm 4 overlies the upper face and the side edges of the curved member 3. It will be clear that the curved guide 6 and its rigidly attached arm 4 are slidable along the protractor 3 and that means are provided for accurately positioning the arm at any desired angular setting on the protractor. As embodied, section 7 of the curved guide 6 is provided with a suitable set screw 8 for clamping the guide and arm to the protractor at any predetermined angular position therealong.

Means are provided for effecting a final and more accurate setting of the arm 4 on the protractor. As embodied, the guide 6 comprises verniers C and D suitably graduated on the edges of the interior arcuate opening 10 of the guide for accurate setting to fractions of the outer and inner scales respectively on the protractor. These vernier scales are movable with respect to the clamped section 7 of the curve guide, by a reversely-threaded slow motion screw 12 connecting the separated sections 6 and 7 and permitting nice and accurate relative movements therebetween. The slow motion screw 12 may be provided with a knurled operating disc 13 for turning the reversely-threaded screw 12 in either direction through the cooperatingly threaded posts or lugs 14 and 15 on the respective guide sections 6 and 7. Thus the clamp screw 8 may be used to set the arm 4 in its approximately predetermined position on the protractor, while the slow motion screw 12 may be used to position the vernier for final accurate adjustment.

The angularly-movable arm 4 is graduated in lineal units and decimals or fractions of units to provide a linear or radial scale E which serves for laying off radial distances and also the hypothenuse of a right triangle to be solved, while other uses and applications of said arm may be made according to data at hand and results desired. The embodied means for laying off selected radii or lineal distances along the arm 4 comprises a vernier F on the slide 20. The construction of the mechanism for the vernier F is generally similar to that described in connection with verniers C and D, comprising the two-part slide 20 and 21 connected by the hereinbefore-described slow motion mechanism 22. A clamping screw 23 is provided on the section 21 of the slide for initially setting the vernier while final adjustment thereof may be accomplished by means of the slow motion screw means.

A suitable scale is provided for indicating or for laying off and setting horizontal distances on one leg of a right-angle triangle. As embodied, a horizontal bar 25 is rigidly secured to leg 2 of the frame at 26 and to the arcuate member 27 of the frame at 28, said member 27 lying inside and slightly spaced from the protractor arc 3. Bar 25 is graduated in lineal units and fractions or decimals thereof, to provide scale G, said units being of the same size as those of lineal scale E on arm 4. A slidable vernier H is mounted on bar 25 and comprises relatively movable sections 29 and 30 and slow motion mechanism 31 substantially the same as those hereinbefore described. It will be clear from the drawings (Figs. 2 and 3) that vernier H and its attached parts are slidable along bar 25 beneath arm 4 with plenty of clearance so that there will be perfect freedom of relative movement between these members.

The embodied means for indicating and laying off vertical distances or legs of triangles comprises a vertically disposed bar 35 graduated with a lineal scale I, which corresponds to scales E and G, and provided with a vernier mechanism J similar to those hereinbefore described. In accordance with the invention, the vertical scale I is movable with respect to the horizontal scale G while maintaining their relative perpendicular relationship. As embodied, bar 35 lies on top of and is rigidly fixed to side bars 36 and 37 of section 29 of the vernier H and is consequently movable therewith along horizontal bar 25 beneath the overlying radial arm 4 and scale E. It will be clear, therefore, that the setting of any predetermined horizontal distance on scale G automatically erects a perpendicular at the predetermined distance by bringing scale I into position. Thus in the solution of right-angled triangls, the laying off of one leg of the triangle automatically predetermines the position of the right angle and of the other leg.

Referring in detail to the construction of the slow motion devices for effecting accurate positioning of a vernier, such detail construction of vernier H is shown in Fig. 3. As embodied, section 30 of the vernier assembly is provided with a knurled clamping screw 40 which binds base plate 41 against the upper face of bar 25. Upstanding posts or lugs 42 and 43 are provided on sections 29 and 30 respectively of the vernier mechanism and said posts have suitable horizontal screw-threaded openings for receiving and supporting the opposite ends of reversely-threaded screw 44. It will be clear that the turning of knurled member 31 causes opposite movements of sections 29 and 30 and permits nice, final and accurate positioning of the vernier along the scale.

The operation of the hereinbefore described devices will be clear from a description thereof in connection with the solution of a particular right triangle. In Fig. 2 the devices are shown at their original or "zero" positions. Assuming now that the course of the traverse (the angle of the hypothenuse with the legs) be 30 degrees and 4 minutes and that the length of the course (the hypothenuse) be 990.49, the arm 4 is swung to the right along the protractor and the clamp screw 8 set at approximately the given angle. The vernier is then manipulated by the slow motion screw 12 until the angle reading is exact. The hypothenuse length may then be laid off on scale E by similar positioning of vernier F. Having established these known data, the legs of the triangle may be determined by moving vernier H and vertical scale I along horizontal scale G until the triangle is automatically formed by cooperation of these parts.

As hereinbefore stated, the invention provides means whereby the laying off of the given data automatically predetermines the setting or positioning of the other members of the device in their proper relations so as to indicate the unknown quantities sought. As embodied, vernier F is provided with an underlying bracket 50 (Fig. 4) from which depends a stud 51. The center of this stud is adapted to lie precisely beneath the center point 5 of the arc 3 and radial arm 4 when vernier F is at its initial or zero position on arm 4, as shown in Fig. 2. Consequently the center of stud 51 accurately measures the true distance of vernier F from the center point 5 of the device. Vernier J, on the vertical scale I, is provided with an angularly projecting bracket 55 which carries at its outer end a yoke shaped member having a recess, the back or seat 56 of which is semi-circular and of the same diameter as stud 51. The recess has a flared mouth provided with curved cam walls or surfaces 57 which cooperate in guiding the stud 51 into the recess.

In operation, assuming the verniers C and F to have been set to the respective angle 30° 04' and length of the hypothenuse 990.49, vernier J is moved along scale I until recess 56 is substantially opposite stud 51. Then vernier H may be moved along scale G toward scale E, carrying vertical scale I and vernier J with it until the yoke on arm 55 engages stud 51 and the seat 56 comes to rest thereagainst. The seating of the stud in the recess accurately fixes the positions of verniers J and H on their respective vertical and horizontal scales and thus automatically determines the legs of the triangle to be solved. The lengths of the legs will be indicated by the verniers J and H and can be read thereon without further positioning movements or settings of any of the devices. Thus, in the exemplary triangle being solved, it will be seen that the vertical leg or latitude measures 857.21, while the horizontal leg or departure would be 496.24 when the parts have been moved to their interlocking positions.

It will further be clear that by the same positioning movements, other functions of the right triangle, or of elements thereof, will be automatically indicated by the same operation. For example, the linear value of the arc subtended by the 30 degree angle at a radius of unity (or 10, 100 etc.) is indicated on the vernier D, while the lengths of arcs for varying radii may be readily obtained by referring the selected radius to the fixed radius, thus arriving at a ratio to be used in converting distance shown on the arc into values based on the selected radius. Similarly, if a number of arcs described with a fixed radius, are to be solved, the use of the ratio as a constant referred to the distance shown on the protractor at each setting, will give the desired distances. Conversely, subtending angles may be found by reversing this process.

By the same method, it is possible to graphically solve any other right angled triangle, having given the necessary data, and to solve any triangle by resolving it into two right triangles. For example, if the two legs are given, the lengths may be laid off on scales G and I, and the arm 4 swung to interlocking position to complete the triangle. The action will be similar when one leg and the course angle are known, and many varied problems may be solved by properly manipulating the device, and changing the sequence of settings and operations according to data given.

Referring now to that embodiment of the invention illustrated in Figs. 5 to 8 inclusive, this mechanism is adapted for even more accurate work than the preferably smaller device hereinbefore described and also the automatic or concerted cooperation of the parts is carried out to a greater extent. As embodied, the mechanism is preferably mounted on a substantially rectangular, flanged base 100 which is formed of strong and rigid material and is adapted to rest on a suitable horizontal surface such as a desk or the like. Said base is provided with a flat upper surface 101 which is cut away to form an arcuate quadrant 102, the center point of which is at 103, in the lower left hand corner of the frame. The curved portion 102 of the frame is adapted to support an arcuate protractor scale composed of the curved strip 105, preferably of metal (Fig. 8) seated upon the base and fixed thereto by suitable set screws 106. The protractor 105 is suitably graduated along its inner and outer edges to form the linear and angular scales B and A respectively, as in Fig. 1. For the sake of clearness the scale graduations are not shown in the drawings of the present modification.

An angularly movable arm 104 is pivotally mounted for rotation about the center point 103 and extends radially therefrom to overlie the protractor scales A and B. Arm 104 is provided with a double vernier 106 at its outer end, said vernier mechanism being generally similar to that described in connection with verniers C and D in Fig. 1. As shown in Fig. 8, the vernier 106 comprises a curved frame having underlying flanges 107 which cooperate with an undercut, flanged trackway 108 on either side of the curved protractor strip 105, whereby perfectly smooth and precise travel of the vernier along the protractor is assured. The protractor is attached to the end of radial arm 104 by overlapping connecting arm 109 and cooperating clamp screw 110. The vernier is preferably provided with the slow motion screw mechanism 111 similar to those hereinbefore described, and also has a clamp screw 112 for setting the vernier on the protractor.

The device is provided with a fixed horizontal scale, comprising the bar 115 which is fixed at either end to the base plate 101 below the plane of movement of arm 104. Bar 115 is suitably graduated in lineal units and corresponds functionally to horizontal scale G of Fig. 1.

The present embodiment of the invention is likewise provided with a vertical scale I, formed on vertically disposed bar 120, which is adapted for movement relative to the horizontal scale G while maintaining its perpendicular relation thereto.

The bar 120 is mounted upon a horizontally movable carriage comprising two triangular shaped end members 128 rigidly fixed to a connecting rod 125 preferably by means of lock nuts 127 engaging threads on reduced ends thereof, and drawing end members into accurate and rigid placement by the provision of shoulders on the rod entering countersunk apertures in crossbeam 126 of end members 128. Further provision for attaining rigidity is arranged by means of clamp or set screws 129 bearing down on rod 125 which enters aperture at the apex of the members 128, as shown.

On either side of and parallel with rigidly fixed rod 125, and engaging the ends of members 128 by means of reduced ends and shoulders in countersunk apertures, are mounted revoluble rods 125'; at each end of which is rigidly mounted a pinion 130, preferably by means of taper pins passing through tapered apertures in protuding hubs, and rods 125'.

The pinions are adapted to travel on cooperating geared racks 131, set in the bottom of the frame 100 and extending along either end thereof. As shown in Fig. 6, the racks are preferably spaced from the walls of the frame 100 by apertured spacing member 132, and are secured thereagainst by screws 133 which pass through the spacing members and into suitable threaded apertures 134 in the walls of the base 100. Suitable flanges or guide plates 135 may be provided on either side of the rack 131 to provide a channel or trackway for the travel of the pinions. Thus the carriage and the scale bar 120 supported thereon are adapted to travel smoothly and perfectly accurately in the horizontal direction along the frame and beneath the overlying arm 104, protractor 105 and horizontal scale 115.

The invention provides means for effecting concerted movement of the scales, whereby setting of known data, such as the given elements of a right angled triangle, will automatically cause the remaining scales and indicating devices to move to the positions predetermined by the given data and thereby lay out and indicate the unknown elements sought. As embodied, the vertical scale bar 120 is provided with a slidable vernier 140 having a setting screw 141, but preferably without the slow motion adjustment means. A vernier device 145 is slidably mounted on scale arm 104 and is provided with clamp screw 146 and the usual slow motion adjustment means 147. Vernier 145 is provided with an arm 150 (Figs. 5 and 6) which underlies the bar 104 and extends axially a short distance therealong. Vernier 140 on bar 120 is also provided with angularly projecting arm 152 which crosses arm 150 and is pivotally connected therewith by a suitably journalled connecting pin 153.

The invention further provides for the simultaneous setting and indication of quantities on the horizontal scale G on bar 115. As embodied, a simple vernier 160, having clamp screw 161, is slidably mounted on bar 115 for horizontal travel therealong. Vernier 160 is attached to the carriage for concerted travel therewith, being provided with an attaching plate 165 which underlies bar 115 and is provided with a screwthreaded recess 166. Plate 165 is fixed to scale bar 120 of the carriage by the connecting stud 167. The bar, in turn, is fastened to the carriage frame by screws 168, which pass through spacing plate 169 and into recesses in carriage member 126.

By virtue of these connections, it will be clear that relative movement of vernier 145 along bar 104 will produce a conjunctive movement of vernier 140 along bar 120 and vernier 160 along bar 115. That is, in the position shown in Fig. 5, if vernier 145 be slid upwardly and to the right along bar 104, it will impel vernier 140 along bar 120 a distance equal to its vertical component, while at the same time the carriage 125 will be rolled to the right, thereby drawing scale bar 120 to the right; and by means of the connecting stud 167 will move vernier 160 along the bar 115 to a position on the scale G indicating a distance equal to the horizontal component of the travel of vernier 145 on bar 104. Similarly, if vernier 140 be moved along bar 120 and/or if bar 120 be moved horizontally, these movements will be reflected in the travel of vernier 145 on bar 104, and in the angular movements of bar 104 about center 103. The positional relation of vernier 160 to the carriage is such that when the carriage is in its farthest left hand position the vernier will read zero on scale G, while movements of the carriage will be accurately and quantitatively indicated on scale G by said vernier. Consequently it will be clear that all these verniers and their attached scale bars are mutually interdependent and always move in concert. However, it will be noted that, with all verniers at their initial points, the arm 104 may be swung freely about the pivot 103 to any position on the arc, without effect on the other parts.

Inasmuch as the verniers on the three scales E, G and I are interdependent, the one slow-motion screw 147 will suffice for accurately setting verniers 140 and 160 on scales I and G, respectively, by moving the swinging arm 104 to a position substantially parallel to the scale bar carrying the vernier where adjustment is sought. Due to the fixed relation of these parts, slow motion screws on more than one vernier might inadvertently cause binding or straining.

From the foregoing it will be clear that I have provided a calculating and indicating mechanism wherein the setting of the known elements automatically effect the laying out and indicating of the unknown elements sought. Thus, in solving a right angled triangle on my device, the setting of any two of the verniers in Fig. 5 will automatically cause the other verniers to travel to the proper positions for indicating the unknown elements of the triangle. In survey work, the given data usually consists of the direction and length of the course and these will be laid out by the verniers 106 and 145 on arm 104. The movement of parts to given positions automatically causes verniers 140 and 160 to assume their correct positions on their respective scales for indicating the latitude and departure of the traverse. Similarly the arcuate values may be read from the scales A and B as hereinbefore described. It will be noted that all the elements of triangles and arcuate measurements of subtending angles may be solved by modifying the sequence of initial settings according to given data, which, of course, must be sufficient; while any triangle may be solved by resolving it into two right triangles. It will further be clear that the positioning of the parts and the operating of the mechanism will be substantially frictionless and smooth as well as exceedingly accurate and rapid. The design of the parts is such that there can be no binding, interference or deflection of the parts, so that the operation and results will be rapid and correct in all positions of the devices.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. A device for indicating and calculating angular and linear quantities in surveying work including in combination an arcuate scale, a linear scale fixed with respect thereto to form one leg of a right angled triangle, a pivoted scale for forming the hypothenuse, and a second linear scale right-angularly disposed and slidable relative to the fixed linear scale for forming the other leg of the triangle, being movable in a path perpendicular to the fixed linear scale, and guiding means for constraining the second linear scale to move in a purely rectilinear path with respect to the fixed linear scale, said means comprising parallel guides spaced equidistantly from the center point of the movable linear scale for controlling the movement thereof with respect to the fixed scale including geared rollers at the ends of said scale for traveling in said parallel guides.

2. A device for indicating and calculating angular and linear quantities including in combination an arcuate scale, a linear scale fixed with respect thereto to form one leg of a right angled triangle, a pivoted scale for forming the hypothenuse, and a second linear scale right angularly disposed and slidable in a path perpendicular to the fixed linear scale, and guiding means for constraining the second linear scale to move in a purely rectilinear path with respect to the fixed linear scale, said means comprising parallel guides spaced substantially equidistantly from the center point of the movable linear scale for controlling the movement thereof with respect to the fixed scale and a settable indicator freely slidable along said movable linear scale and having pivotal connection with the hypothenuse scale.

3. A device for indicating and calculating angular and linear quantities including in combination an arcuate scale, a linear scale fixed with respect thereto to form one leg of a right angled triangle, a pivoted scale for forming the hypothenuse, and a second linear scale right angularly disposed and slidable in a path perpendicular to the fixed linear scale, and guiding means for constraining the second linear scale to move in a purely rectilinear path with respect to the fixed linear scale, said means comprising a guide slidable on the fixed scale and centrally disposed relatively to the movable scale, and a settable indicator freely slidable along said movable linear scale and having pivotal connection with the hypothenuse scale.

WILLIAM J. KAUFFMAN.